(12) United States Patent
Rake et al.

(10) Patent No.: US 10,253,878 B2
(45) Date of Patent: Apr. 9, 2019

(54) DEVICE FOR LOCKING AN OPERATING ELEMENT OF AN AUTOMATIC TRANSMISSION OF A VEHICLE, METHOD FOR OPERATING SUCH A DEVICE AND SWITCHING DEVICE FOR SWITCHING AN AUTOMATIC TRANSMISSION OF A VEHICLE

(71) Applicants: ZF Friedrichshafen AG, Friedrichshafen (DE); Lemförder Electronic GmbH, Espelkamp (DE)

(72) Inventors: Ludger Rake, Steinfeld (DE); Andreas Giefer, Lemfoerde (DE); Sascha Rosentreter, Espelkamp (DE); Ralf Hartrampf, Wagenfeld (DE)

(73) Assignees: ZF Friedrichshafen AG, Friedrichshafen (DE); Lemförder Electric GmbH, Espelkamp (DE)

( * ) Notice: Subject to any disclaimer, the term of this patent is extended or adjusted under 35 U.S.C. 154(b) by 387 days.

(21) Appl. No.: 15/029,888

(22) PCT Filed: Sep. 17, 2014

(86) PCT No.: PCT/EP2014/069762
§ 371 (c)(1),
(2) Date: Apr. 15, 2016

(87) PCT Pub. No.: WO2015/055369
PCT Pub. Date: Apr. 23, 2015

(65) Prior Publication Data
US 2016/0238128 A1  Aug. 18, 2016

(30) Foreign Application Priority Data

Oct. 17, 2013 (DE) .................. 10 2013 221 039

(51) Int. Cl.
*F16H 61/22* (2006.01)
*F16H 59/08* (2006.01)

(52) U.S. Cl.
CPC ............. *F16H 61/22* (2013.01); *F16H 59/08* (2013.01); *F16H 2059/081* (2013.01)

(58) Field of Classification Search
CPC ..... F16H 61/22; F16H 59/08; F16H 2059/081
See application file for complete search history.

(56) References Cited

U.S. PATENT DOCUMENTS 5,277,077 A * 1/1994 Osborn ................... F16H 59/10
29/401.1
6,295,887 B1 * 10/2001 DeJonge ................ B60K 37/06
477/99

(Continued)

FOREIGN PATENT DOCUMENTS

DE  10 2004 041 087 A1  3/2006
DE  10 2006 007 600 A1  8/2007

(Continued)

OTHER PUBLICATIONS

International Search Report and Written Opinion of the International Search Authority dated Dec. 16, 2014 in International Application No. PCT/EP2014/069762 (English and German languages) (13 pp.).

(Continued)

*Primary Examiner* — David M Fenstermacher
(74) *Attorney, Agent, or Firm* — Brinks Gilson & Lione

(57) ABSTRACT

A device for locking an operation element of an automatic transmission of a vehicle may comprise a rotationally mounted locking comb including a locking contour configured to be coupled with an operation element. The device may further comprise a locking element, where the locking element is configured to be arranged in a first position outside the locking contour to release the locking comb for (Continued)

a rotational movement to allow a shifting movement of the operation element. The locking element may be configured to be arranged in a second position in the locking contour to fix the locking comb for locking the operation element. The device may further comprise a rotationally mounted set ring with a control contour for guiding the locking element between the first position and the second position.

19 Claims, 6 Drawing Sheets

(56) References Cited

U.S. PATENT DOCUMENTS

| | | | | |
|---|---|---|---|---|
| 2003/0159534 | A1* | 8/2003 | Babin | F16H 59/105 74/473.12 |
| 2004/0229726 | A1 | 11/2004 | Wilde et al. | |
| 2009/0217782 | A1 | 9/2009 | Wang | |
| 2015/0159747 | A1* | 6/2015 | Hoskins | F16H 59/0217 74/473.23 |
| 2015/0167827 | A1* | 6/2015 | Fett | F16H 59/08 74/473.3 |
| 2016/0017983 | A1* | 1/2016 | Levesque | F16H 59/0204 74/473.25 |

FOREIGN PATENT DOCUMENTS

| | | |
|---|---|---|
| DE | 10 2007 042 113 A1 | 3/2009 |
| EP | 1 657 475 A2 | 5/2006 |
| EP | 2 034 383 A2 | 3/2009 |
| EP | 2 660 091 A1 | 11/2013 |
| WO | WO 2006/021198 A1 | 3/2006 |
| WO | WO 2013/123375 A2 | 8/2013 |

OTHER PUBLICATIONS

German Search Report dated Jul. 18, 2014 for German Patent Appliction No. 10 2013 221 039.6 (German language) (7 pp.).

* cited by examiner

DEVICE FOR LOCKING AN OPERATING ELEMENT OF AN AUTOMATIC TRANSMISSION OF A VEHICLE, METHOD FOR OPERATING SUCH A DEVICE AND SWITCHING DEVICE FOR SWITCHING AN AUTOMATIC TRANSMISSION OF A VEHICLE

This application is a filing under 35 U.S.C. § 371 of International Patent Application PCT/EP2014/069762, filed Sep. 17, 2014, and claims the priority of German Patent Application 10 2013 221 039.6, filed Oct. 17, 2013. These applications are incorporated by reference herein in their entireties.

TECHNICAL FIELD

The present embodiments relate to a device for locking an operation element of an automatic transmission of a vehicle, to a method for operating such a device and to a shifting device for shifting an automatic transmission of a vehicle.

BACKGROUND

In the automotive sector are known shifting mechanisms for automatic transmission with multistable gear positions such as "P", "R", "N", "D" and the so-called "shift-lock" function in the gear positions P and N and partially with a so-called "AutoP" function, i.e. an automatic transmission-side parking lock. In the shift-lock function, the gearshift lever is blocked and released again only after the actuation of the brake. The shift-lock function is usually realized by an actuator, e.g. an electromagnet. With AutoP, when the parking lock has been engaged in the transmission, the P position is immediately engaged at the shifting mechanism by means of an actuator.

DE 10 2006 007 600 A1 discloses a rotary actor device for electrical or electronic devices in a vehicle.

Against this background, the present embodiments provide an improved device for locking an operation element of an automatic transmission of a vehicle, an improved method for operating a device for locking an operation element of an automatic transmission of a vehicle and an improved shifting device for shifting an automatic transmission of a vehicle.

BRIEF SUMMARY

The design of a reset ring of an automatic transmission shift device of a vehicle with a control contour in conjunction with a suitably arranged locking element allows, by rotation of the reset ring, to block or unblock an operation element of the shifting device coupled with the reset ring. In a further function, the return ring can be formed to enable a resetting of the operation element from an AutoP function to a parking position.

According to this approach of the enlargement of the reset ring for an autoP function by a control contour for a locking element of a shift-lock function, these functions can be optimally integrated in terms of cost and package. Also, another feature of locking a locking comb of the shifting device can be integrated.

In particular, only a single actuator or electric motor is required for the function realization presented here.

A device for locking an operation element of an automatic transmission of a vehicle comprising a rotationally mounted locking comb with a locking contour directly coupled to the operation element, a locking element, which is configured to be arranged in a first position outside the locking contour to release the locking comb for a rotational movement in order to allow a shifting movement of the operation element, and to be arranged in a second position of the locking contour to fix the locking comb for locking the operation element, and a rotationally mounted set ring with a control contour for guiding the locking element between the first position and the second position.

The device can be a device or part of a device of the vehicle. The vehicle can be a road-bound vehicle, such as a passenger car or a truck. The operation element can be a ring or gearshift lever of the automatic transmission, which can for example be operated by the driver of the vehicle by hand to engage various gears of the automatic transmission. For example, the driver can shift the operation element, e.g. by rotating or sliding between the positions P for parking, D for drive, R for reversing and N for shifting the transmission into neutral. In particular with the operation element being designed as a rotary knob, the locking knob can have an annular configuration and can be arranged parallel to a plane of rotation of the operation element. The locking comb is used for transmitting an actuation of the operation element to the automatic transmission and can be coupled via mechanical fasteners with the operation element so that a movement of the operation element causes a uniform, parallel movement or rotation of the locking comb.

The locking comb can comprise a circumferential locking contour characterized by a plurality of comb-like arranged elevations by which a movement of the operation element can be optimally implemented in a gear position of the automatic transmission. The locking contour can be designed for example in the form of a suitably dimensioned recess between the elevations of the locking comb. The locking element can be arranged fixed in place with respect to a rotational movement of the locking comb, for example in a housing or supporting structure of the device. The locking element can be formed, for example, as a cuboid and be positioned in the device in such a manner that it can be moved along a longitudinal axis of the cuboid shape between the first and the second position. The locking element can be formed to be located farther from a center of the circular locking comb in the first position than in the second position. The stationary arrangement of the locking element with respect to a rotational movement of the locking comb can be accomplished, for example, by an engagement of the locking element on an inner side of a housing of the device. The set ring can be formed as a disk with a central bore. The set ring can be arranged in the device parallel to the locking comb. The control contour can be formed integrally with the set ring and be designed to be moved between the first and the second position along the locking element in order to move it. When the locking element in the second position engages in the locking contour, the locking comb and thus the operation element is locked with respect to a rotational movement. Thus, the operational element can be blocked for operation by the driver. By moving the locking element to the first position, the locking comb and thus also the operation element can be moved again. The driver can thus again operate the automatic transmission by the operation element.

According to an embodiment of the device, the locking contour can be formed by a recess in the locking comb, wherein a contour of the recess can correspond to a contour of the locking element. Thus, with the locking element formed as a cuboid, the recess can correspondingly have a rectangular U-shape. The dimensions of the recess may be slightly larger than the dimensions of the locking element so that the locking element can be moved into the recess in and out again without jamming. With this embodiment, the locking element can be moved between the first and the second position quickly and with little risk of jamming.

For example, the control contour can be formed by a groove extending in the ring set. Here, in a first section the groove can extend closer to an outer contour than to an inner contour of the set ring, and in a second groove section come closer to the inner contour, for example, in the second groove section can bend in the direction of the inner contour of the set ring. The first groove section can be formed to guide the locking element in the first position. The second groove section can be formed to guide the locking element from the first position to the second position. The groove can be formed along a course of a ring shape of the set ring. The groove can completely pass through the set ring or can be only elaborated in the form of a recess from the surface of the set ring facing the locking element. A control contour designed as a groove is easy to manufacture and requires very little maintenance.

For example, the locking element can comprise on one side facing the control contour a protrusion, which can be adapted to engage with the control contour for guiding the locking element. The protrusion can be formed integrally with the locking element. Using the protrusion, the locking element can be moved with particular precision and positional accuracy and with less energy. With a positive connection of the protrusion with the control contour can be avoided any unintentional slipping of the locking element in a simple manner.

The apparatus may be constructed such that the locking comb is arranged between the set ring and the operation element, and the locking element is arranged radially with respect to the locking comb and the set ring and is adapted to be moved in a radial direction relative to the locking comb and the set ring between the first position and the second position. By the sandwich arrangement of the locking comb between the set ring and the operation element, the locking comb can perform its task to convert a rotation of the set ring into locking or unlocking the operation element in a particular functional and space-saving manner.

The radial arrangement of the locking element in relation to the locking comb is particularly functional in that the locking comb is fixed and released by the locking element transversely to a rotational movement direction of the locking comb.

According to a further embodiment, the device can further comprise a locking pin which is formed to engage in a first position in a grid, for example, a grid contour, of the locking comb. Thus, the locking functionality can be realized by interaction of the locking pin located in the first position with the grid of the locking comb. The operational element can be moved from one position to another position only by overcoming the locking pin. When the locking pin is in the first position, the locking comb can thus be moved over the locking pin, for example, upon actuation of the operation element by the driver. The locking pin is further formed in a second position to release the locking comb for a free-wheeling rotational movement, thus discontinuing the locking functionality. In the second position, the locking pin can be located outside the locking contour of the locking comb. In this case, the locking comb can further comprise a stop element and the rotationally mounted set ring can further comprise a control cam and a nose. Here, the control cam can be formed to move the locking pin from the first position to the second position upon a rotational movement of the set ring, and the nose can be formed to entrain the stop element upon the rotational movement of the set ring, while bypassing the locking functionality, in order to turn the locking comb to a parking position for shifting the operational element without overcoming the locking.

The locking pin can be moved to the second position against a spring force of a spring element, with which the locking pin is loaded. The stop element can be arranged between elevations of the locking comb and have a stop surface extending perpendicular to a plane of rotation of the locking comb. The control cam of the set ring can be formed on an outer contour of the set ring in the form of a rounded protrusion, while the nose of the set ring can be formed on an inner contour of the set ring. The nose can in particular have a counter surface for abutting the stop surface of the stop element and forming a cross point between the set ring and the locking comb. The control cam and the nose may be formed integrally with the set ring. This embodiment allows an advantageous combination of the resetting of the operation element in the so-called autoP function with the shift-lock function by a simple change in the direction of rotation of the set ring. Thus, the resetting of the operation element can be achieved by turning the set ring in one direction, while the shift-lock function can be activated by turning back the set ring in a direction opposite to the direction of rotation.

In particular, the control contour can extend in the area of the control cam in the ring set. In this manner, the combination of the autoP function and the shift lock can be realized particularly effectively.

Furthermore, the device can comprise a coupling element coupling the set ring with the actuator. The coupling element can be configured to transmit a torque of the actuator to the set ring to generate the rotational movement of the set ring. The coupling element can for example be designed as a gear, which can be arranged in a parallel plane adjacent to the set ring and can be directly or indirectly coupled to it. The actuator can be, for example, an electric motor.

With this embodiment, a movement of the electric motor can be converted in a simple and cost-effective manner into a first rotational movement of the set ring in a first rotational direction and into a second rotational movement of the set ring in a second rotational direction opposite to the first rotational direction.

A shifting device for shifting an automatic transmission of a vehicle includes an operation element which is adapted to be shifted between a parking position or a neutral position of the automatic transmission and at least one driving position of the automatic transmission, and a device for locking an operational element wherein the locking comb of the device is directly coupled to the operation element.

The operation element can be designed, for example, as a rotary knob and adapted to be operated by a driver of the vehicle. So the driver can turn the operation element in two opposite directions of rotation to a parking position "P", a drive position "D", a reverse position "R", a neutral position "N" to engage the corresponding gears in the automatic transmission of the vehicle. The operation element can be coupled to the device in such a manner that a position of the set ring has a direct impact on the rotatability of the operation element. In particular, it can be achieved that in the absence of activation of a brake of the vehicle by the driver of the vehicle, the operation element can be blocked by means of the set ring when the operation element is for example in the position "P" or "N". With activation of the brake by the driver, the set ring can unblock the operation element, and the driver can turn or shift the operation element for example from the "P" to the "D" position. For example, the operation member can be pushed on the device and/or can be connected by a form-fit, force-fit or material-locking connection with the locking comb, or another connection device of the device.

A method for operating a device for locking a operation element of an automatic transmission of a vehicle, said device comprising a rotationally mounted locking comb directly connectable or connected with the operation element with a locking contour, a locking element, which is designed to be arranged in a first position outside the locking contour in order to release the locking comb for a rotational movement to allow a shifting movement of the operation element, and to be arranged in a second position in the locking contour in order to fix the locking comb to lock the operation element, and a rotationally mounted set ring having a control contour for guiding the locking element between the first position and the second position, includes a step of rotating the set ring to move the locking element from the first position to the to the second position by means of the control contour in order to fix the locking comb for locking the operation element.

According to an embodiment, the method further includes a step of turning-back the set ring to move the locking element from the second position to the first position by means of the control contour in order to release the locking comb for allowing a shifting movement of the operation element for a rotational movement.

The steps of rotating and turning back can cause, by each respective rotational movement of the set ring, rotation in opposing directions.

The method can be advantageously implemented using said device.

BRIEF DESCRIPTION OF THE DRAWINGS

The current embodiments are explained in more detail based on the accompanying drawings. The figures show.

DETAILED DESCRIPTION

Figure 1:
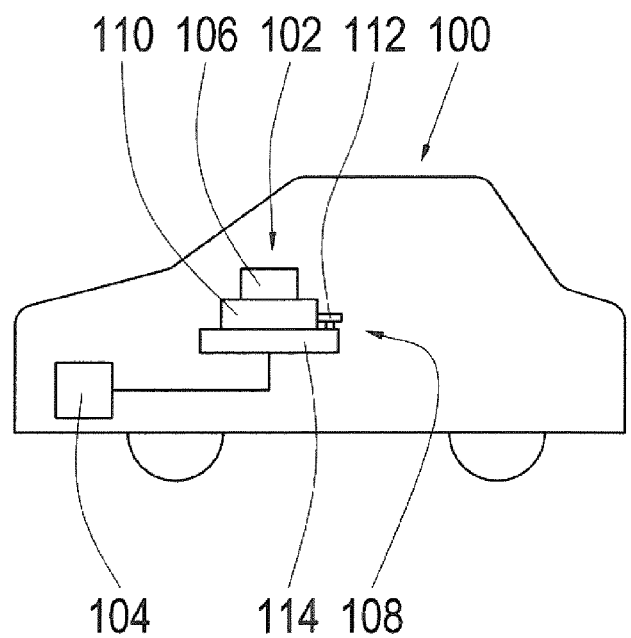
FIG. 1 shows a schematic representation of a shifting device for shifting an automatic transmission of a vehicle, according to an embodiment.

In the following description of preferred embodiments, same or similar reference numerals are used for the similarly acting elements shown in the various figures and a repeated description of these elements is dispensed with.

FIG. 1 shows by way of schematic representation a vehicle 100 with a shifting device 102 according to an embodiment. The shifting device 102 is formed for switching an automatic transmission 104 of the vehicle 100 and is composed of an operation element 106 and a device 108 for locking the operation element 106. The device 108 is coupled to the operation element 106.

By actuating the operation element 106, the driver can select the switching states of the automatic transmission 104, e.g. P for parking, D for drive, R for reversing and N or 0 for a neutral position of the transmission 104. By means of the device 108, the operation element 106 can be locked for an operation by the driver, for example, when the driver has not activated a brake of the vehicle 100 in the gear positions P and N. As soon as the driver presses the brake with his foot, the device 108 releases again the operation element 106 and the driver can set the desired gear. The shifting device 102 receives information about a current actuation or non-actuation of the brake, for example, via a control unit of the vehicle 100 coupled with the shifting device 102.

For this purpose, the device 108 includes a rotationally mounted locking comb 110 directly coupled with the operation element 106 with a (not shown) locking contour, a locking element 112, and a rotationally mounted set ring 114 with an (also not shown here) control contour for guiding the locking element 112 between a first and a second position. The locking element 112 is designed to be placed in the first position outside the locking comb 110 and to be placed in the second position in the locking contour of the locking comb 110 in order to lock the operational element 106 as a result of fixing the locking comb 110.

Figure 2:
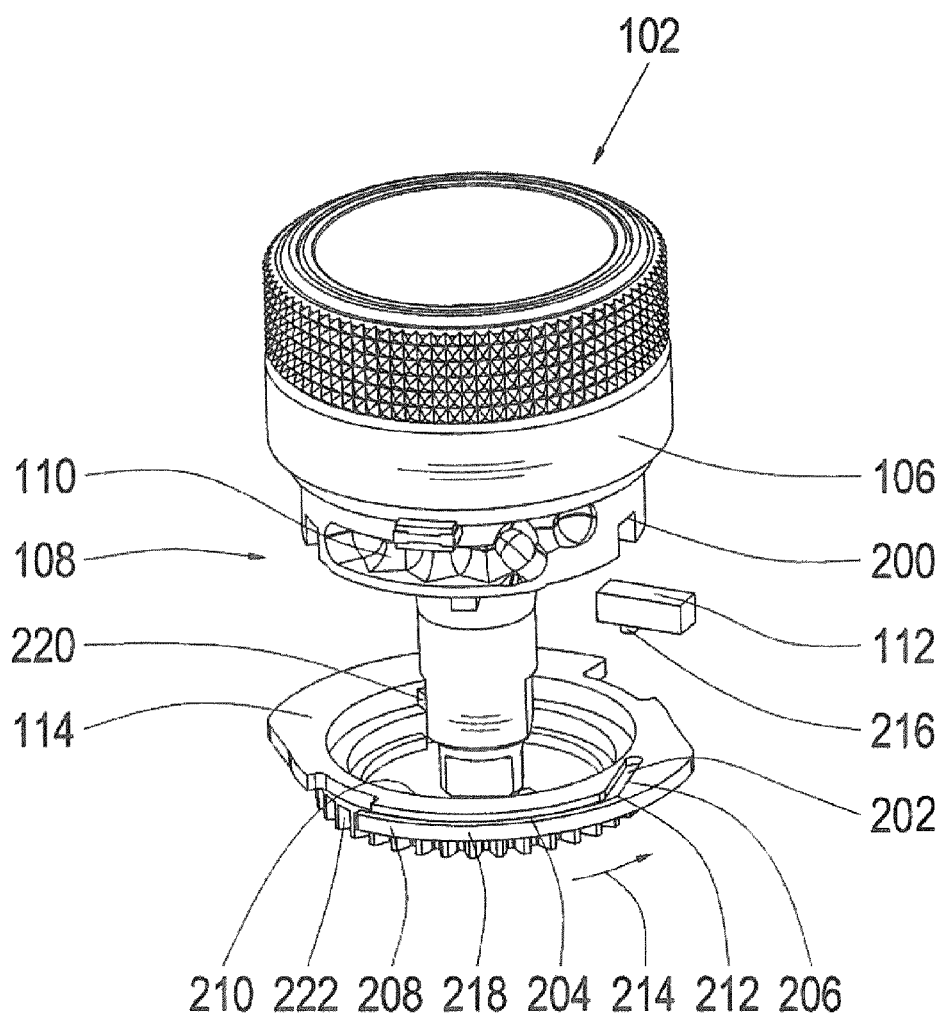
FIG. 2 shows an exploded perspective view of the shifting device of FIG. 1 according to an embodiment.

FIG. 2 shows an embodiment of the shifting device 102 of FIG. 1 in a more detailed representation. To better illustrate the shifting device 102, it is shown exploded in FIG. 2. The operation element 106 coupled with the device 108 is designed to be handled by a driver of the vehicle in which the shifting device 102 is installed to set different gears with the automatic transmission of the vehicle connected to the shifting device 102. In the embodiment of the shifting device 102 shown in the illustration in FIG. 2, the operation element 106 is designed as a rotary knob and has a corresponding cylindrical shape. Corresponding to the embodiment as a rotary knob, a switching operation of the shifting device 102 is executed by rotating the operation element 106. For this purpose, a section of the cylindrical wall of the operation element 106 has a corrugated surface for better gripping. The goal of the presented inventive device 108 is to provide the shift-lock function, i.e. to block the operation element 106 with the vehicle brake not activated, when the transmission of the vehicle is in the parking position or idling, and to cancel the locking by activation of the vehicle brake. According to the embodiments, in addition to the shift positions P and N, the gearshift lever or the operation element 106 can be also locked in other positions.

As the illustration in FIG. 2 shows, the locking comb 110 is arranged between the operation element 106 and the set ring 114. The operation element 106, the locking comb 110 and the set ring 144 are arranged in parallel planes. The locking comb 110 is directly coupled to the operation element 106, has a cylindrical or annular shape and is in the circumference slightly smaller than the operation element 106. The locking comb 110 is rotationally mounted in the device 108. A locking contour of the locking comb 110 clearly visible in FIG. 2 enables precise setting of the gears on the operation element 106.

The locking element 112 is designed here as an elongate cuboid and arranged with respect to its longitudinal axis radially opposite the locking comb 110 and aligned with a locking contour 200 of the rotary knob 106. The locking element 112 is configured to be arranged in a first position outside the locking contour 200 so that the locking comb 110 can be freely rotated in both directions. The locking element 112 is designed to engage in a second position in the locking contour 200 to fix the locking comb 110. The locking element 200 is arranged stationary in the device 108 with respect to a rotational movement of the locking comb 110, i.e. it can be moved radially with respect to the locking comb, but not along a circumference of the locking comb 110. The locking contour 200 is formed by a castellated-like recess in the locking comb 110, which is aligned to the set ring 114 and the locking contour 112. In this form, the locking contour 200 is thus ideally suited for receiving the cuboid locking element 112. To allow moving the locking element 112 into the locking contour 200 and out of it again without jamming, the locking contour 200, the recess forming the locking comb 110 is dimensioned slightly larger than the locking element 112.

The movement of the locking element 200 between the first position and the second position is realized by means of a control contour 202 arranged in the set ring 114. The also rotationally mounted ring 114 is arranged adjacent to the locking comb 110 and in a plane parallel to the plane of the locking comb 110. As the diagram in FIG. 2 shows, the control contour 202 is formed by a groove extending in the set ring. The groove is formed from the surface of the set ring 114 aligned towards the locking comb 110 and extends in its depth up to another surface opposite the surface, which is the underside of the set ring 114. Alternatively, the groove can also be formed as a recess in the surface of the set ring, wherein the underside of the set ring 114 remains closed. As the diagram in FIG. 2 clearly shows, the control contour groove 202 consists of a first groove section 204 and a second groove section 206.

The first groove section 204 is longer than the second groove section 206 and extends closer to an outer contour 208 than with an inner contour 210 of the set ring 114 and is substantially parallel to the outer contour 206 of the set ring 114. In the shorter second groove portion 206, the control contour 202 bends from a break point 212 straight in the direction of the inner contour 210. According to the characteristic course at the outer edge 208 of the set ring 114, the first groove section 204 is formed, upon rotation or a rotational movement 214 of the set ring 114, to guide the locking element 112, which is stationary with respect to the rotational movement 214, in the first position, i.e., outside the locking contour 200.

With the characteristic course in the direction of the inner edge 210 of the set ring 114, the second groove section 206 is adapted, upon turning 214 of the set ring 114, to guide the locking element 112 toward a center of the locking comb 110 and thus into the locking contour 200 arranged opposite to the locking element 112 in order to create the second position of the locking element 112 and thus fix the locking comb 112. The rotational movement 214 and its direction are indicated in the diagram in FIG. 2 by means of a direction arrow.

For proper and safe guidance of the locking element 112 between the first and the second positions, the locking element 112 has a protrusion 216, which is arranged on a side of the locking element 112 facing the set ring 114 with the control contour 202. The protrusion 216 is formed here integrally with the locking element and is suitable to be engaged by the control contour 202, for example, by a positive locking.

As the illustration in FIG. 2 shows, the control contour 202 is arranged in a region of the set ring 114, which forms a control cam 218 of the set ring 114 shaped as a rounded projection. The function of the control cam 218 and the nose 220 formed on the inner contour 210 of the set ring 114 is discussed in connection with the autoP function based on the following FIGS. 3A to 3C.

As the illustration in FIG. 2 shows, the device 108 comprises at its lower end a coupling element 222, which is designed to transmit a torque of an actuator to the set ring 114 for moving the operation member 106 to generate the rotational movement 214 of the set ring 114. The coupling element 222 is designed here as a gear which is arranged with a main side fixed on the set ring 114. On the side opposite the main side, the coupling element 222 can be connected to an electric motor, whose torque is transmitted to the set ring 114 and ultimately to the operational element 106 via the coupling element 222.

Figure 3A:
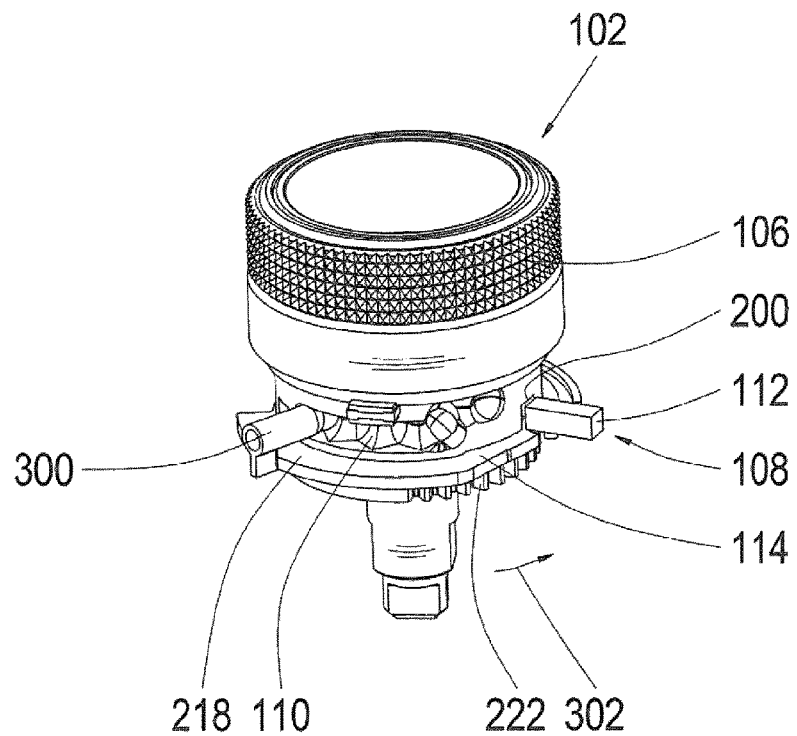
FIG. 3A shows a perspective view of the shifting device of FIG. 2 with decoupled locking pin and unlocked operation element according to an embodiment.
Figure 3B:
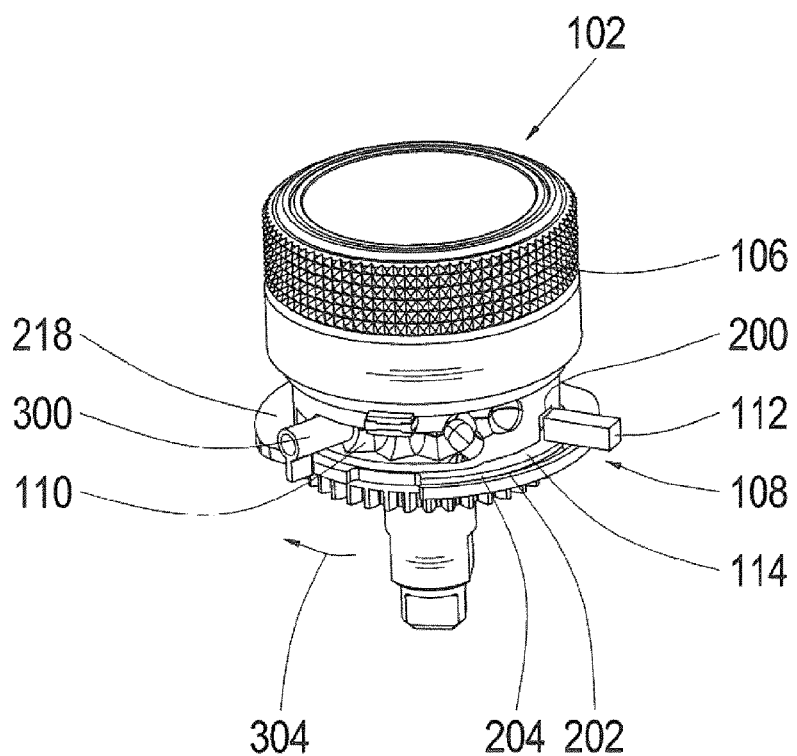
FIG. 3B shows a perspective view of the shifting device of FIG. 2 with coupled locking pin and unlocked operation element according to an embodiment.
Figure 3C:
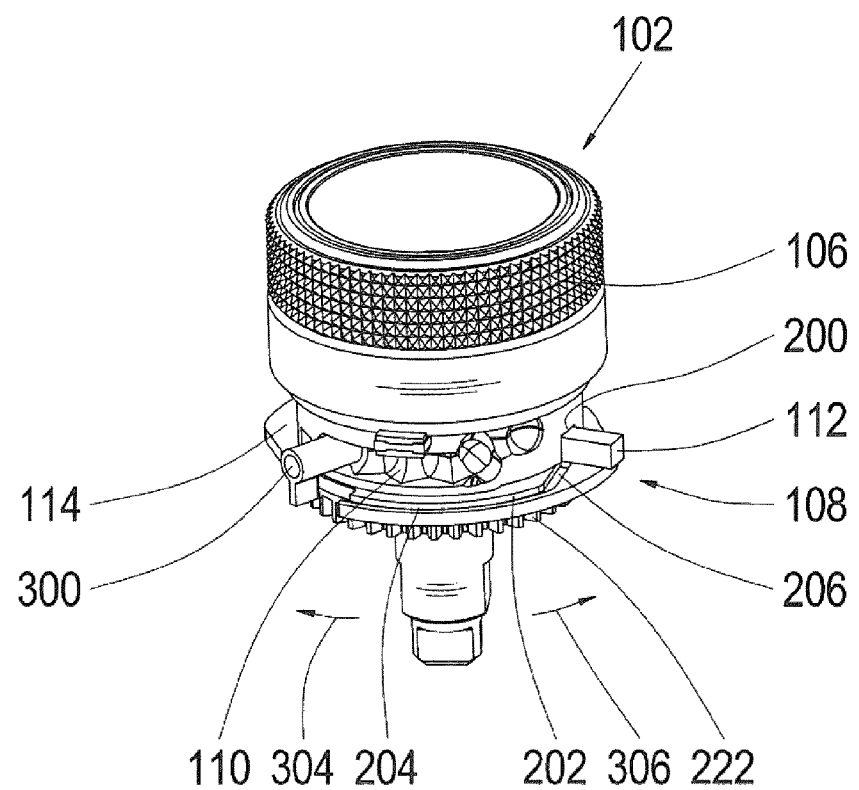
FIG. 3C shows a perspective view of the shifting device of FIG. 2 with coupled locking pin and locked operation element according to an embodiment

An advantageous functional integration of the main feature of the current embodiments, the shift-lock function, is explained with the autoP function based on the following FIGS. 3A to 3C.

FIG. 3A shows a perspective view of an embodiment of the shifting device 102 of FIG. 2. In the embodiment of the shifting device 102 shown in the diagram the two functions autoP and shift-lock are integrated.

As already indicated, at autoP, a position of a shift knob for an automatic transmission of a vehicle is brought into accordance with an automatic parking brake of the automatic transmission in that the gearshift lever is turned by means of an actuator from one of the positions D, R or N etc. indirectly back to the position P. For this purpose, the inventive shifting device 102 is equipped, in addition to the previously presented elements, in particular with a spring-loaded locking pin 300.

As the diagram in FIG. 3A shows, the spring-loaded locking pin 300 is arranged radially opposite the locking comb 110 and passes through the locking comb 110 at two diametrically opposite positions. The locking pin 300 is arranged fixed in the housing of the shifting device 102 and is configured in a first position to engage in the locking contour of the locking comb 110 in order to fix it in the locking contour. In this position, the locking comb 110 can be moved only over the locking pin 300, i.e. in a more sluggish manner. In a second position, the locking pin 300 is moved out of the locking contour in order to release the locking comb 110 for a smooth freewheeling rotational movement.

The locking pin 300 is connected to a spring element of the device 108 not shown in the diagram in FIG. 3A, which is designed to hold the locking pin 112 in the first position or move it there by means of the spring force. The already mentioned control cam 218 is formed by a larger radial expansion of the set ring 114 than in a remaining region of the set ring 114 and is configured to move the locking pin 300 against the spring force from the first position to the second position in response to rotation of the set ring 114.

In the functional state illustrated in FIG. 3A, a rotation 302 of the set ring 114 marked by means of a direction arrow has occurred for decoupling the locking pin 300 and the locking comb 110.

The status display of the resetting position in FIG. 3A shows that at the rotation of the set ring 114, the control cam 218 picked up the locking pin 300 by a protrusion of the locking pin 300 and moved it to the second position in which the locking comb 110 is released for a rotation.

According to the autoP function, in the reset position shown in FIG. 3A, a stop element of the locking comb 110 (not shown here) is entrained during the rotation by the nose (also not shown here) arranged inside the set ring 114 being offset in relation to the control cam 218. The gearshift lever or rotary knob 106, which is rotationally mounted and connected directly to a locking grid, is thus at autoP function including the locking grid 110 indirectly turned back by the electric motor connected by the coupling element 222 with the set ring 114 and thus brought in accordance with the parking lock of the transmission.

For the locking comb 110 to be entrained at the autoP function in the rotation 302 of the set ring 114, the locking pin or the locking element 112 in the functional state shown in FIG. 3A is not active, i.e., is located outside the locking contour 200.

Based on FIG. 3B and 3C, the shift-lock function of the shifting device 102 will now be discussed in more detail.

FIG. 3B shows a further perspective view of the center position of the shifting device 102 of FIG. 3A. Here, the set ring 114 turned by a first section marked by a direction arrow in a direction opposite to that shown in FIG. 3A.

As the diagram in FIG. 3B shows, the control cam 218 has released the locking pin 300, which was coupled again by means of the spring force and fixed the locking comb 110. The locking element 112 is guided in this first section of rotation 304 in the first groove section 204 of the control contour 202. Accordingly, the locking element 112 is in the first position, i.e. outside the locking contour 200 and thus is not active.

The shift-lock function is in the switching state shown in FIG. 3B when neither P nor N is set on the shift knob 106 or the vehicle brake is activated. In this state, the shift lock is deactivated and the driver can operate the operation element 106.

FIG. 3C shows by a further perspective view a state diagram of a locked position of the shift-lock function of the shifting device 102 at the end of rotation 304. The locking element 112 is guided here in the second groove section 206 of the control contour 202. Accordingly, the locking element 112 is in the second position and engages the locking contour 200. Thus, the locking element 112 is active and fixes the locking comb 110. In the switching state of the shifting device 102 shown in FIG. 3C, the shift lock is activated; the operation element 106 cannot be moved to another position, for example, while the transmission is in the parking or neutral position and the vehicle brake is not active. The locking pin 300 continues to be is coupled.

When in the state of the shifting device 102 shown in FIG. 3C the driver actuates the vehicle brake, the actuator (not shown) connected by the coupling element 222 with the set ring 114 causes a back turning 306 of the set ring 114 marked in the illustration by a direction arrow until the guidance of the locking element 112 is again taken over by the first groove section 204. Accordingly, the locking element 112 moves again out of the locking contour 200 and releases the locking comb 110 for a rotational movement. The driver can now operate the operation element 106 and engage the desired gear.

The functional integration illustrated by FIGS. 3A-3C enables shifting with a shift-lock function without requiring an additional actuator. For this purpose, in the autoP function the already existing reset ring 114 is provided with the additional control contour 202. This control contour 202 moves the locking element 112, which is fixedly arranged in the housing of the shifting device 102. Thus, the gearshift lever 106 is locked or unlocked in the positions P and N. The existing actuator takes over the rotation of the reset ring 114.

To summarize, we will again explain the functional sequence of the shift-lock function in P and N shown in FIGS. 3A-3C. At autoP, first the locking pin 300 and locking grid 110 are uncoupled. Upon further rotation 302 of the reset ring 114, the locking grid 110 is then entrained at the coupling point and turned back to P. After the gearshift lever 106 has reached the P position 114, the reset ring 114 is returned in an opposite rotation 304 to its initial position. Here, the locking pin 300 is again brought into engagement with the locking grid 110.

At the request "Engage shift lock", the reset ring 114 is further rotated in the direction of rotation 304 against the autoP direction so that locking element 112 is moved by the control contour 202. Thus, the gearshift lever or rotary knob 106 is locked.

At the request "Disengage shift lock", the reset ring 114 is rotated back to the initial position in the rotation 306. The control contour 202 moves the locking element 112 and thus unlocks the gearshift lever 106.

Figure 4:
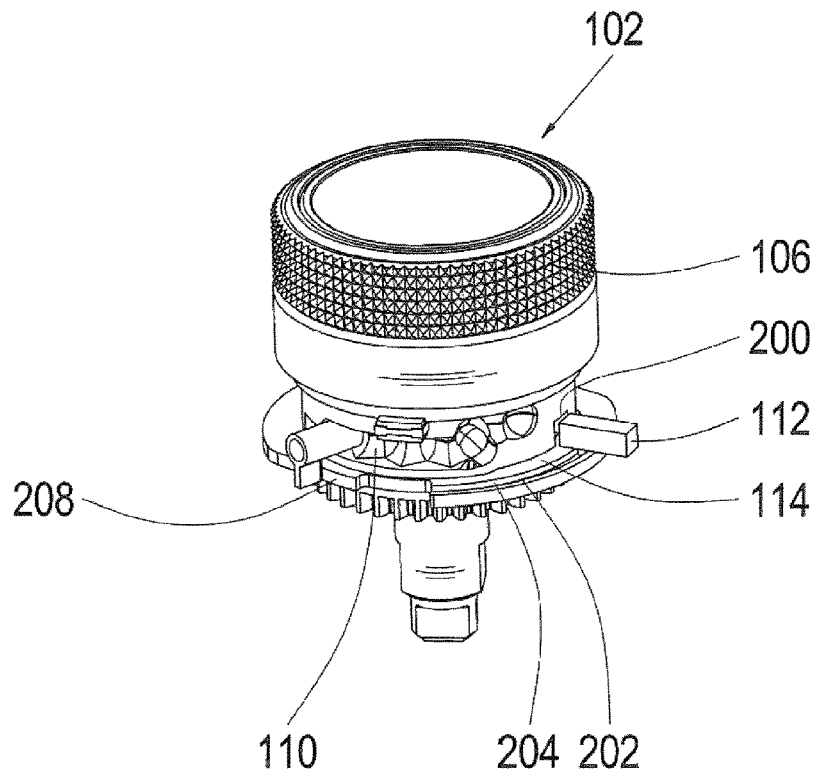
FIG. 4 shows a detailed perspective view of the shifting device of FIG. 2 with unblocked operation element according to an embodiment.
Figure 5:
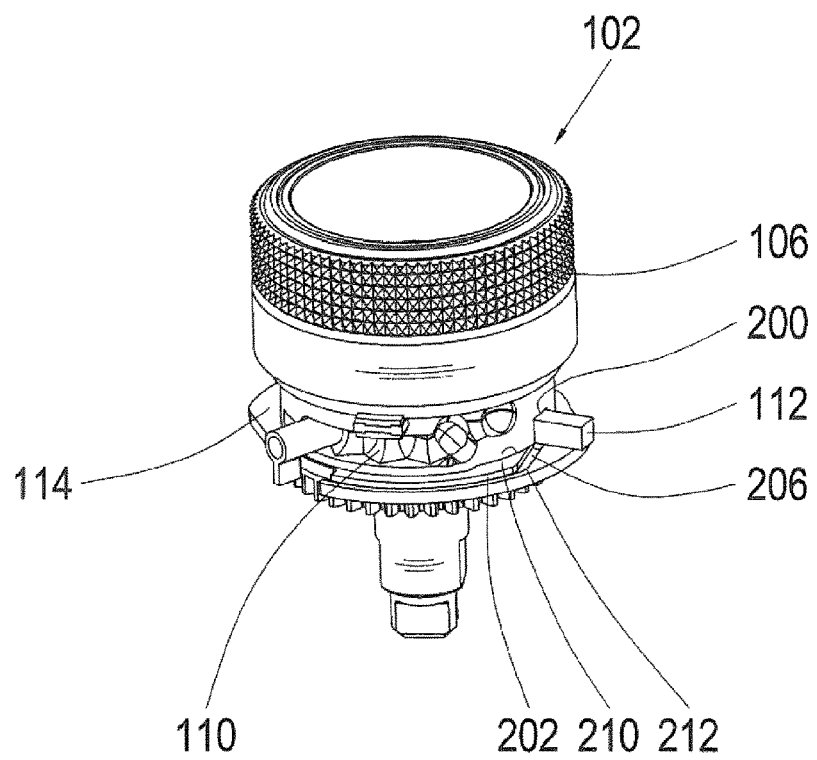
FIG. 5 shows a detailed perspective view of the shifting device of FIG. 2 with locked operation element according to an embodiment.

FIGS. 4 and 5 show detailed views of the shifting device 102 with decoupled locking 110 and the shift-lock function by the locking element 112.

FIG. 4 shows by way of a perspective detail view the shifting device 102 with released operation element 106, according to an embodiment. In the switching state shown in FIG. 4, the fixed locking member 112 is guided in the first groove section 204 of the control contour 202. The first groove section 204 extends close to the outer contour 208 of the set ring 114 and thus holds the locking element 112 at a distance from the locking comb 110. Thus, the locking element 112 is in the first position and does not engage in the locking contour 200 of the locking comb 110. The operation element 106 is unlocked and can be shifted.

FIG. 5 shows by way of a further perspective detail view the shifting device 102 with locked operation element 106, according to an embodiment. In the switching state shown in FIG. 5, the fixed locking member 112 is guided in the second groove section 206 of the control contour 202. The second groove section 206 is characterized by a bending of the control contour 202 at the inflection point 212 toward the inner contour 210 of the set ring 114. According to its course, the second groove section 206 pulls the locking element 112 toward the center of the annular locking comb 110. In the functional state of the shift-lock function of the shifting device 102 shown in FIG. 5, the locking element 112 is located in the second position, engages in the locking contour 200 of the locking comb 110 and fixes it. The operation element 106 is locked and cannot be shifted.

Figure 6:
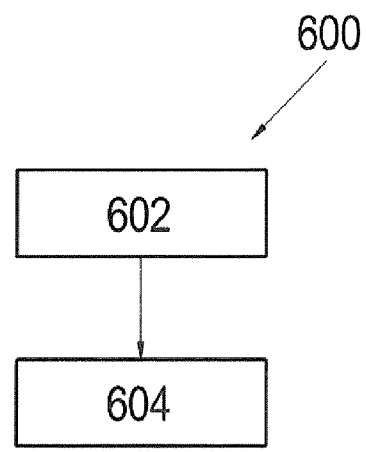
FIG. 6 shows a flow chart of a method for operating a device for locking an operation element of an automatic transmission of a vehicle according to an embodiment.

FIG. 6 shows a flow chart of an embodiment of methods 600 for operating a device for locking an operation element of an automatic transmission of a vehicle.

The device to be operated by the method 600 can be the device explained with reference to the preceding figures which is coupled or can be coupled to an operation element of an automatic transmission of a vehicle and is composed of a rotationally mounted locking comb with a locking contour, a locking element for locking and unlocking of the operation element and a rotationally mounted set ring with a control contour for guiding the locking element.

The method can be performed by a device coupled to the control unit of the vehicle.

In step 602, the set ring is rotated by an actuator coupled to the device in a predetermined first rotational direction in order to move the locking element by means of the control contour from a first position to a second position and so to fix the locking comb and to lock the operation element.

The operation element can now no longer be moved by an operator. In a step 604, the set ring is rotated in a second rotational direction opposite to the first rotational direction in order to move the locking element by means of the control contour from the second position back to the first position and so to release the locking comb for a rotational movement of the operation element coupled to the locking comb. The operation element is thus unlocked and can be moved by an operator.

The steps 602, 604 allow implementing the requests "Engage shift lock" and "Disengage shift lock".

In further optional steps which can be performed, for example, prior to steps 602, 604, an autoP functionality can be implemented. For this purpose, the set ring can initially be rotated in the second rotational direction to cancel engagement of a locking pin in the locking comb and then, without having to overcome the grid of the locking comb, rotate the locking comb so far that the operation element is brought into the parking position. Subsequently, the set ring can be rotated in the first rotational direction to bring the locking pin again in engagement with the locking comb. The driver can now again shift the operation element over the grid of the locking comb. Step 602 can now be executed to engage the shift lock.

Even though the operation element is shown in the figures already coupled to the device for locking the operation element, the device for locking the operation element can also be provided without the operation element. The operation element can for example be mounted on the device at a later date.

If a described element is formed to allow functionality, this can mean that the element is suitably formed and/or arranged in order to allow the functionality.

The embodiments described and shown in the figures are chosen only by way of example. Different embodiments can be combined wholly or in respect of individual features. An embodiment can also be supplemented by features of another embodiment. Furthermore, the method steps can be repeated and executed in a sequence other than the sequence described.

If an embodiment includes an "and/or" link between a first feature and a second feature, it can be read so that the exemplary execution according to an embodiment comprises both the first feature and the second feature and in accordance with another embodiment, comprises either only the first feature or the second feature.

REFERENCE NUMERALS

100 Vehicle
102 Shifting device
104 Automatic transmission
106 Operation element
108 Device for locking the operation element
110 Locking comb
112 Locking element
114 Set ring
200 Locking contour
202 Control contour
204 fist groove section
206 Second groove section
208 Outer contour of the set ring
210 Inner contour of the set ring
212 Break point
214 Rotational movement
216 Protrusion
218 Control cam
220 Nose
222 Coupling element
300 Locking pin
302 Rotation for uncoupling the locking pin
304 Rotation of the set ring for locking the operation element
306 Turning back of the set ring to unlock the operation element
600 Method for operating a device for locking an operation element
602 Step of rotating the set ring
604 Step of turning back the set ring

We claim:

1. A device for locking an operation element of an automatic transmission of a vehicle, the device comprising:
a rotationally mounted locking comb including a locking contour configured to be coupled with an operation element;
a locking element, wherein the locking element is configured to be arranged in a first position outside the locking contour to release the locking comb for a rotational movement to allow a shifting movement of the operation element, and wherein the locking element is configured to be arranged in a second position in the locking contour to fix the locking comb for locking the operation element; and
a rotationally mounted set ring with a control contour for guiding the locking element between the first position and the second position.

2. The device of claim 1, wherein the locking contour is formed by a recess in the locking comb, and wherein the recess corresponds to a contour of the locking element.

3. The device of claim 1, wherein the control contour is formed by a groove extending in the set ring, wherein the groove has a first groove section that extends closer to an outer contour than to an inner contour of the set ring, wherein the groove has a second groove section that draws closer to the set ring, wherein the first groove section is formed to guide the locking element in the first position, and wherein the second grove section is formed to guide the locking element from the first position to the second position.

4. The device of claim 1, wherein the locking element comprises a protrusion on a side facing the control contour, wherein the protrusion is formed to engage with the control contour for guiding the locking element.

5. The device of claim 1, wherein the locking comb is arranged between the set ring, wherein the operation element and the locking element is arranged radially relative to the locking comb and the set ring, and
wherein the operation element is formed to be moved in radial direction relative to the locking comb and the set ring between the first position and the second position.

6. The device of claim 1, further comprising a locking pin with a first pin position to engage in the locking contour of the locking comb and a second pin position to release the locking comb for a rotational movement, wherein the locking comb includes a stop element and the rotationally mounted set ring includes a control cam and a nose, wherein the control cam is formed by a radial expansion of the set ring and is configured to move the locking pin from the first position to the second position, and wherein the nose is formed upon the radial expansion of the set ring to engage the stop element to turn the locking comb in order to shift the operation element to a parking position.

7. The device of claim 6, wherein the control contour of the set ring extends adjacent to the control cam.

8. The device of claim 1, wherein the device further comprises a coupling element which connects the set ring with an actuator and is configured to transmit a torque of the actuator to the set ring to generate the rotational movement of the set ring.

9. A method for operating a device for locking an operation element of an automatic transmission of a vehicle, wherein the device comprises:
- a rotationally mounted locking comb configured to directly connect with the operation element with a locking contour;
- a locking element configured to be arranged in a first position outside the locking contour to release the locking comb in order to allow a shifting movement of the operation element and configured to be arranged in a second position in the locking contour to fix the locking comb in order to lock the operation element; and
- a rotationally mounted set ring with a control contour for guiding the locking element between the first position and the second position, wherein the method comprises:
turning the set ring to move the locking element from the first position to the second position by the control contour in order to fix the locking comb for locking the operation element.

10. The method of claim 9, further comprising turning the set ring to move the locking element from the second position to the first position by the control contour to release the locking comb for a rotational movement in order to allow a shifting movement of the operation element.

11. The method of claim 9, wherein the locking contour is formed by a recess in the locking comb, and wherein the recess corresponds to a contour of the locking element.

12. A shifting device for shifting an automatic transmission of a vehicle, the shifting device comprising:
- an operation element configured to be shifted between a parking position or a neutral position of the automatic transmission and at least a driving position of the automatic transmission; and
- a locking device for locking the operation element, wherein a locking comb of the device is directly connected with the operation element, wherein the locking device of the shifting device comprises:
- the locking comb including a locking contour configured to be coupled with the operation element, wherein the locking comb is rotationally mounted;
- a locking element configured to be arranged in a first position outside a locking contour to release the locking comb for a rotational movement to allow a shifting movement of the operation element, and wherein the locking element is configured to be arranged in a second position in the locking contour to fix the locking comb for locking the operation element; and
- a rotationally mounted set ring with a control contour for guiding the locking element between the first position and the second position.

13. The shifting device of claim 12, wherein the locking contour is formed by a recess in the locking comb, and wherein the recess corresponds to a contour of the locking element.

14. The shifting device of claim 12, wherein the control contour is formed by a groove extending in the set ring, wherein the groove has a first groove section that extends closer to an outer contour than to an inner contour of the set ring, wherein the groove has a second groove section that draws closer to the set ring, wherein the first groove section is formed to guide the locking element in the first position, and wherein the second grove section is formed to guide the locking element from the first position to the second position.

15. The shifting device of claim 12, wherein the locking element comprises a protrusion on a side facing the control contour, wherein the protrusion is formed to engage with the control contour for guiding the locking element.

16. The shifting device of claim 12, wherein the locking comb is arranged between the set ring, wherein the operation element and the locking element is arranged radially relative to the locking comb and the set ring, and wherein the operation element is formed to be moved in radial direction relative to the locking comb and the set ring between the first position and the second position.

17. The shifting device of claim 12, further comprising a locking pin with a first pin position to engage in the locking contour of the locking comb and a second pin position to release the locking comb for a rotational movement, wherein the locking comb includes a stop element and the rotationally mounted set ring includes a control cam and a nose, wherein the control cam is formed by a radial expansion of the set ring and is configured to move the locking pin from the first position to the second position, and wherein the nose is formed upon the radial expansion of the set ring to engage the stop element to turn the locking comb in order to shift the operation element to a parking position.

18. The shifting device of claim 17, wherein the control contour of the set ring extends adjacent to the control cam.

19. The shifting device of claim 12, wherein the locking device further comprises a coupling element which connects the set ring with an actuator and is configured to transmit a torque of the actuator to the set ring to generate the rotational movement of the set ring.

\* \* \* \* \*